United States Patent [19]

Sussman

[11] Patent Number: 5,483,586

[45] Date of Patent: Jan. 9, 1996

[54] ELECTRONIC ON-LINE SUBSCRIBER TELEPHONE DIRECTORY

[76] Inventor: Lester Sussman, 9213 Bulls Run Pkwy., Bethesda, Md. 20817

[21] Appl. No.: 276,701

[22] Filed: Jul. 18, 1994

[51] Int. Cl.⁶ .................................................... H04M 3/42
[52] U.S. Cl. ........................... 379/201; 379/355; 379/216
[58] Field of Search .................................. 379/94, 96, 97, 379/98, 201, 207, 213, 216, 354, 355, 95

[56] References Cited

U.S. PATENT DOCUMENTS

| | | | |
|---|---|---|---|
| 4,800,582 | 1/1989 | D'Agosto, III et al. | 379/216 |
| 4,839,919 | 6/1989 | Borges et al. | 379/354 |
| 4,942,616 | 7/1990 | Linstroth et al. | 379/97 |
| 5,239,573 | 8/1993 | Rangan | 379/97 |

*Primary Examiner*—Jeffery A. Hofsass
*Assistant Examiner*—Scott Wolinsky

[57] ABSTRACT

A compact telephone directory system that integrates a subscriber's telephone with a local on-line telephone directory database system and with a central directory service provider that maintains the local on-line telephone directory database. The telephone directory database system comprises an electronically stored equivalent of a telephone book. The telephone directory database can, for example, store local residential directories, local business directories, local and federal government directories, and a user specific directory. The user specific directory contains telephone numbers and other information that is particular to a subscriber, or a group of subscribers as in the case of a business. This information can be grouped into various lists as determined by the subscriber. All of the directories, excluding the user specific directory, are maintained by a Central Telephone Directory Service Provider (CTDSP), that downloads the directories to the subscriber's telephone directory system. The subscriber can select the frequency at which updates to his directories are received from the CTDSP via the public telephone network. The compact telephone directory system is secured from non-authorized users, i.e. hackers. This system provides advantages over current telephone directory systems, including books and CD-ROMS for example, by automating the maintenance of the various directories by a central service provider and eliminating the mailing of updated directories to the subscriber.

15 Claims, 2 Drawing Sheets

ELECTRONIC ON-LINE SUBSCRIBER TELEPHONE DIRECTORY

BACKGROUND OF THE INVENTION

This invention relates to a compact telephone directory system that integrates a subscriber's telephone with an on-line telephone directory database system that is connected to the subscriber's telephone. The firmware for the telephone directory database system is incorporated into the telephone system, whether as part of the telephone, or as an add-on device that integrates with the telephone. The subscriber's on-line telephone directory is maintained by a central telephone directory service provider.

The telephone directory database system is effectively an electronically stored equivalent of a telephone book. The telephone directory database can, for example, store local residential directories, local business directories, local and federal government directories, and a user specific directory. The directory database can be configured to store other areas' residential, and/or business directories, and/or local government directories. The only limitation to the number of various directories that can be stored, is the limitation of hardware memory that current art supports. Storage technology supports increasingly larger volumes of data. For example IBM announced a new method, that exploits giant magneto-resistance technology, to store and retrieve data from magnetic disks at a rate of 30 times more than today's disks allow ("An Advanced Technology To Read Data", New York Times August 1992). The trend to move towards on-line telephone directories can be seen in the prior art.

U.S. Pat. No. 4,899,377 to Baner et al. teaches a communications terminal that enables the user to create and to manage a personal telephone directory.

U.S. Pat. No. 4,800,582 to D'Agosto III et al. teaches another method and apparatus to create and store telephone directory listings.

Both of these patents require the user to manually update the directory listings if they change. In any given community the number of changes in both residential and business telephone directory listings can change quite considerably during the year. These changes are reflected in the frequency of the re-issuing of telephone books to all telephone subscribers. U.S. Pat. Nos. 4,899,377 and 4,800,582 do not provide an easy method for updating a large directory listing.

U.S. Pat. No. 4,979,206 to Padden et al. teaches a system that uses automatic speech recognition to provide telephone directory assistance, without the aid of an operator.

U.S. Patent 5,204,894 to Darden teaches a central telephone directory system that provides a subscriber with a personal electronic directory. This system is similar in principal to a number of hand-held personal digital organizers (PDOs) that are currently available. For example the "Wizard" from Sharp Corporation and the "Organizer PS660" from Texas Instruments. The primary difference between these devices and the '894 is the method of interaction, i.e. the '894 is a central on-line transaction database system that is accessed via the Common Carrier Telecommunications Switching Network (CCTSN) and a DTMF ("touch-tone") telephone, whereas the PDOs do not require a DTMF telephone to access the subscriber's personal directory listing.

Bell Atlantic is currently offering a system that stores telephone directories on CD-ROM and requires a CD-I player from Philips ("Phone company calls time on paper directories", New Scientist, Jun. 26, 1993). The Bell Atlantic CD-ROM stores 1.2 million residential, 0.4 million business numbers and 1000 color video advertisements. Updating of the CD-ROM requires a new CD-ROM to be shipped to the subscriber, i.e. similar to the way today's telephone books are updated.

The current invention recognizes that such prior telephone directory inventions have certain limitations that the current invention proposes to overcome.

OBJECTIVES OF THE PRESENT INVENTION

Therefore it is an objective of the present invention to provide an improved method and apparatus to provide a telephone subscriber (user) with a personal on-line (down-loaded, read-only) telephone directory database; that is easy to use and maintain.

A further objective is to provide an apparatus that interfaces with a user's current telephone whereby the directory database is updated periodically from a central telephone directory service provider.

A further objective is to provide the means whereby the user can obtain telephone numbers by searching subscriber names, subscriber business services and subscriber locations.

A further objective is to provide the means whereby the user can create and maintain lists of commonly used subscriber telephone numbers, names and addresses, as well as assigning a unique label to each list.

A further objective is to provide the means whereby the apparatus will dial the selected telephone number, or numbers.

DETAILED DESCRIPTION OF THE INVENTION

Figure 1:
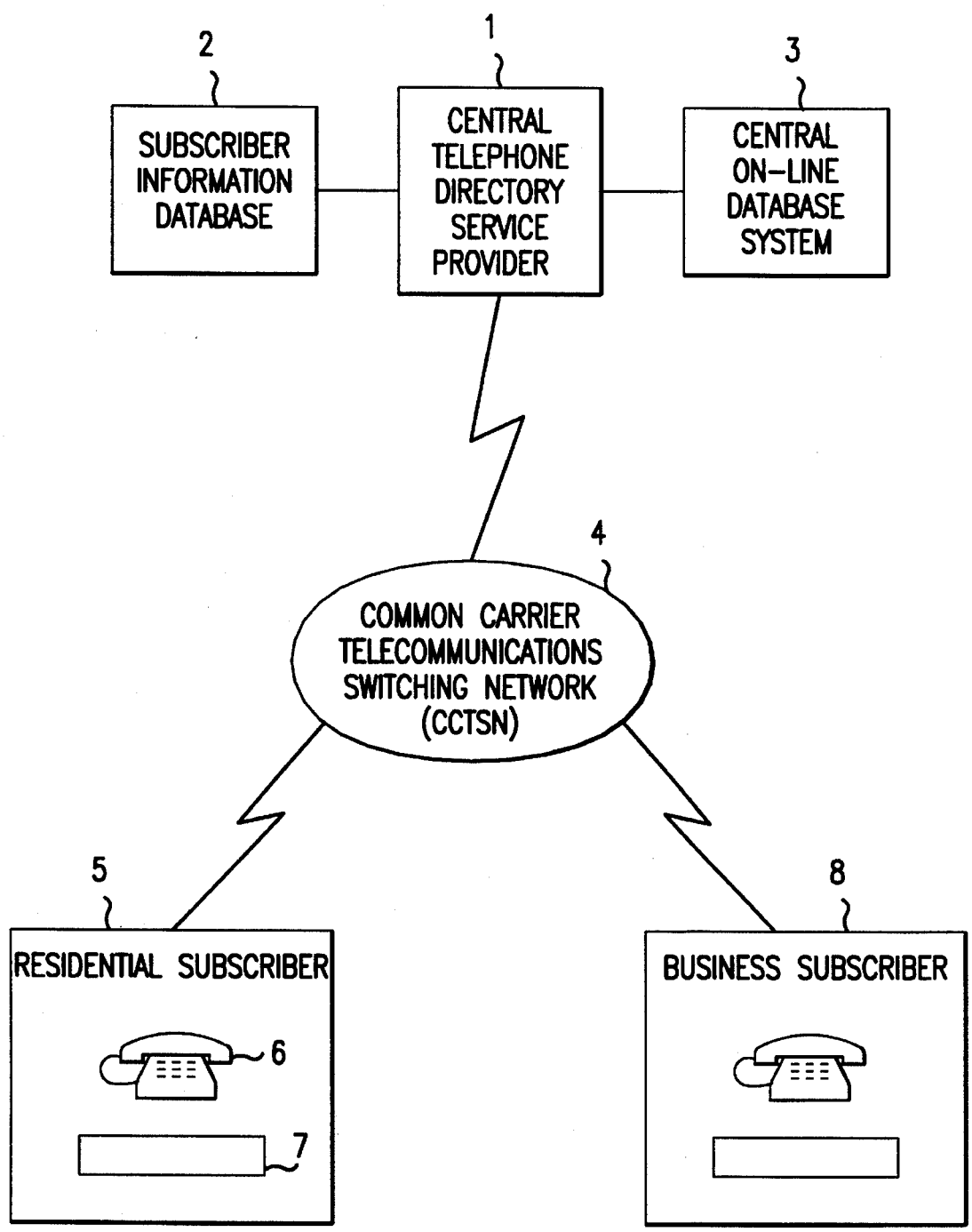
FIG. 1 is a block diagram illustrating the connectivity between various subscribers of the on-line (down-loaded, read-only) telephone directory system, the central telephone directory service provider and the Common Carrier Telecommunications Switching Network.

FIG. 1 is a block diagram showing the connectivity between a Central Telephone Directory Service Provider 1, a residential subscriber 5 and a business subscriber 8 via the Common Carrier Telecommunications Switching Network (CCTSN) 4. The Central Telephone Directory Service Provider 1 maintains both residential and business telephone directories in a Central On-line Database System 3.

Because of the constant changes in subscribers in the Central On-line Database System 3, the current invention's preferred embodiment has implemented various levels of frequency at which the subscriber could elect to receive updated on-line (down-loaded, read-only) directories. For example, a basic service residential subscriber could select to receive updated telephone directories semi-annually, whereas a business subscriber could apply for a monthly update subscription service, or a quarterly update subscription service. The preferred embodiment of the invention also supports other subscriber update rates, e.g. weekly, fortnightly, or at any user specified interval of time. This data, the subscription rate data, is kept in the Subscriber Information Database 2 at the Central Telephone Directory Service Provider 1. The Subscriber Information Database 2 determines when to transmit the modified directories to the subscribers 5 and 8. Prior to transmittal, by the Central Telephone Directory Service Provider 1, the modified directories are compressed. This is done to optimize the available bandwidth in the CCTSN, as well as to reduce the amount of time that the subscriber's telephone line would be occupied during this download operation. Many data compression/decompression techniques are currently available, e.g. Huffman coding by D. A. Huffman and NUPAK for numeric data and ANPAK for alphanumeric data by B. A. Marron and P. A. D. de Maine. Data decompression software resides in the subscriber's Integrated Electronic Telephone Directory 7. Other subscriber information stored in the Subscriber Information Database 2 includes billing data, i.e. subscriber name, address, phone number, etc.

As mentioned previously, the preferred embodiment of the invention allows the user to select the date and time at which the directory updates are received. For example, a business subscriber 8 could determine to receive directory updates on the last day of each month at 2:00 AM. On the other hand, a residential subscriber 5 could select to receive updates on June 30 and December 30 at 11:00 PM each year. This information is stored in the Subscriber Information Database 2. This feature minimizes the inconvenience of the directory update procedure tying up the subscriber's telephone line, as well as to capitalize on any off-peak-hour discount that the CCTSN 4 may offer subscribers in using the network 4. When the Integrated Electronic Telephone Directory 7 receives updated directories, an indication of this activity is given on the Display Unit 16 (see FIG. 2). On the other hand, if the subscriber does not select a directory update date and time, then a program in the Central Telephone Directory Service Provider will determine when the optimum time is to transmit the update telephone directories to the subscriber. The program takes advantage of off-peak discounts in the CCTSN 4.

The preferred embodiment of the invention provides computer based security to prevent unauthorized access to the subscribers' 5 and 8 systems. The present invention uses a system of subscriber identification numbers and encrypted password codes that need to be authenticated before any changes can be made to the subscribers' 5 and 8 systems via the CCTSN 4. Only the Central Telephone Directory Service Provider 1 determines and knows the subscriber's identification number and encrypted password codes. This information is stored in the Subscriber Information Database 2. The present embodiment of the invention records any incident whereby unauthorized access was attempted. This information is available to the Central Telephone Directory Service Provider 1, who can retrieve this data from the subscriber's system via the CCTSN 4.

Figure 2:
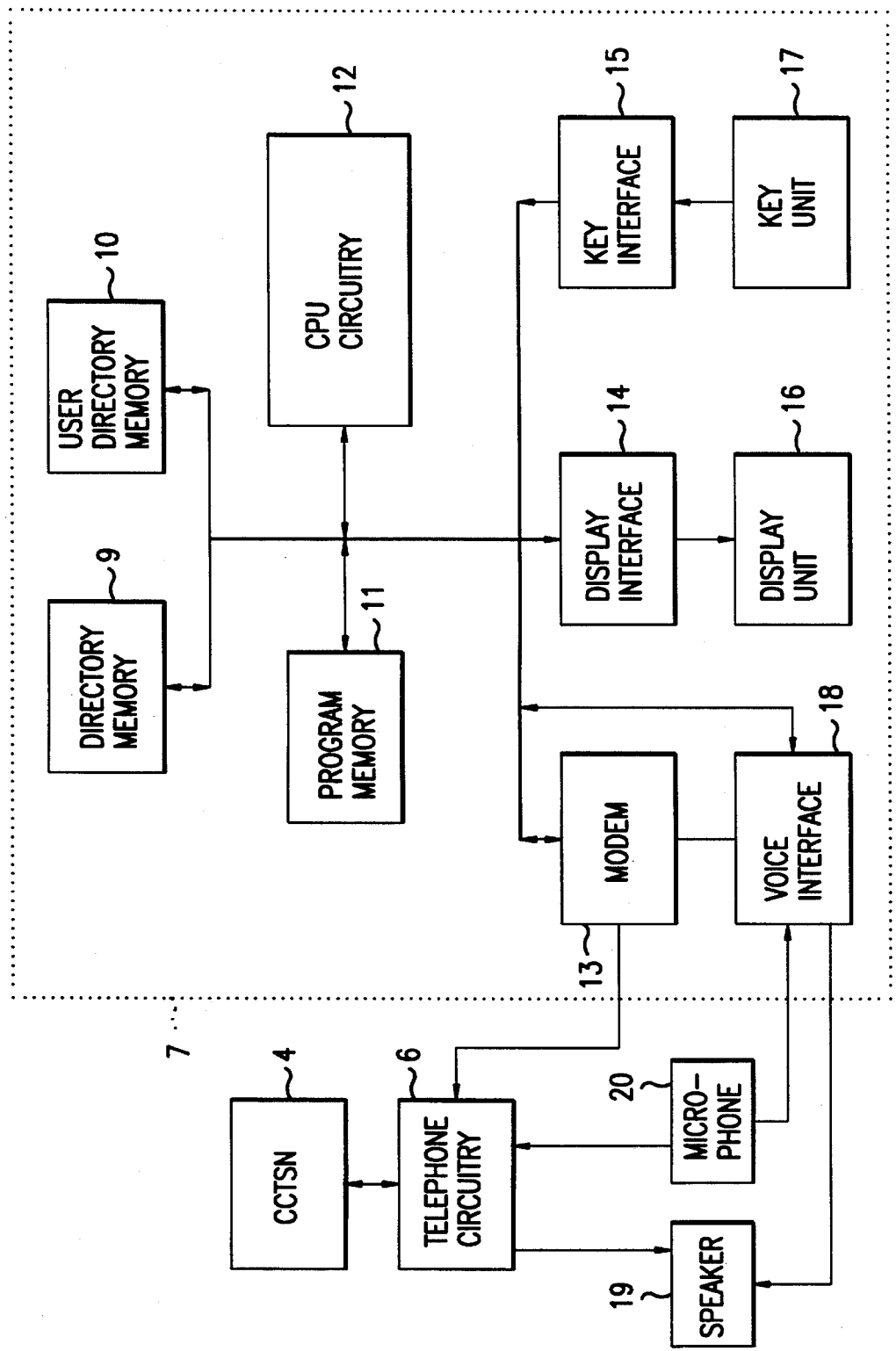
FIG. 2 is a block diagram of the subscriber's on-line (down-loaded, read-only) telephone directory system.

FIG. 2 is a block diagram of a principal circuit for implementing the present invention. The circuit comprises of a CPU 12, Program Memory 11, Directory Memory 9, User Directory Memory 10, a modem 13, telephone circuitry 6, a Display Interface 14, a Display Unit 16, a Keypad Interface 15, a Keypad Unit 17, a Voice Interface 18, a microphone 19 and a speaker 20.

Program Memory 11 contains all the programs that the CPU 12 uses to interface with all of the present invention's circuit modules 6, 9 through 11, and 13 through 20. Program Memory 11 also contains all of the programs required to enter, store, retrieve, edit and delete all of the user definable data in User Directory Memory 10. Program Memory 11 also contains programs to receive and decompress directory data between the present invention and the Central On-line Database System 3, via the modem 13, the telephone circuitry 6 and the CCTSN 4. Furthermore, Program Memory 11 also contains all of the non-volatile system messages, (for example, functional user interface menus, which are the preferred means of user interaction in the current embodiment, and error messages), that are to be displayed via the Display Interface circuit 14 and the Display Unit 16, or are to be heard on the speaker 20 via the Voice Interface circuit 18. Implementation of the Program Memory 11 in the preferred embodiment of the invention is by means of Flash memory, e.g. from Intel and SGS-Thompson. This form of programmable memory was selected because it enables the programs that control the invention to be updated from the Central On-line Database System 3 via the CCTSN 4.

Directory Memory 9 contains all of the subscriber's (5 and 8) on-line telephone directories, that are down-loaded from the Central On-line Database System 3. These directories can be residential, and/or business, and/or local government, and/or federal government. This memory can be implemented using small hard disk devices such as a 3.5 inch drive available from Teac America, or the 1.8 inch PCMIA-compatible devices available from companies such as SyQuest Technology, and Hewlett-Packard. This memory can also be implemented using Flash memory, for example the FlashFile 28F032SA chip from intel. Any other form of economical read/write mass storage media that is available in the current art could be used to implement this memory. The preferred embodiment of the current invention uses a hard disk storage memory device. It is also feasible to compress the directory information in order to optimize the available Directory Memory 9. The directories can be installed at the time of purchase. For example, if the user buys the invention from a store, then the manufacturer of the invention can provide a system, e.g. CD-ROM based as offered by Bell Atlantic, so that the user's selection of telephone directories can be directly down loaded into the invention without having to be connected to the CCTSN 4. This option alleviates a potentially time consuming step in setting up the subscriber's initial Directory Memory 9. This method is part of the preferred embodiment of the invention.

User Directory Memory 10 contains all of the subscriber's (5 and 8) on-line personal telephone directories. These directories can be any telephone number, e.g. residential, business, and/or government. User directories are a list of phone numbers that are pertinent to an individual, or a group of subscribers, as may be the case in a business environment. This list is implemented in the current invention as a linked list index into the Directory Memory 9. The use of an index into the Directory Memory 9 optimizes memory usage in the invention by not duplicating telephone directory information already stored in the Directory Memory 9. On the other hand, if the phone number stored in the User Directory Memory 10 does not exist in the Directory Memory 9, then the pertinent information is stored in the User Directory Memory 10. The added telephone number information is stored in the same format as information stored in the Directory Memory 9. When the user enters a new number directly into the User Directory Memory 10, as opposed to browsing and selecting a number from Directory Memory 9, the invention initially searches Directory Memory 9 and User Directory Memory 10 to determine whether or not the user entered number is currently defined within the system. If the new number does not exist within the system, then the user is notified and prompted to enter other pertinent information, e.g. subscriber name, address, etc. This facilitates the use of the various programs available in Program Memory 11 to manage this information. This memory can be implemented using small hard disk devices such as a 3.5 inch drive available from Teac America, or the 1.8 inch PCMIA-compatible devices available from companies such as SyQuest Technology and Hewlett-Packard. This memory can also be implemented using Flash memory, for example the FlashFile 28F032SA chip from Intel. The preferred embodiment of the current invention uses a hard disk storage memory device.

The Keypad Interface circuit 15 receives an output from a user selected key on the Keypad Unit 17, delivers its corresponding coded key output, senses the meaning of the key output and develops an output representative of its results, that is interpreted by the CPU 12.

The Display Interface 14 controls the Display Unit 16 by means of data received from the CPU 12. The Display Unit 16 could be any form of display that present technology avails, for example LCD or LED displays. Because of the relatively low power consumption of the present day LCD technology, this said form of Display Unit is used by way of preference in the embodiment of the present invention.

The Voice Interface 18 interfaces with the microphone unit 19 and speaker unit 20 to provide speech-recognition and speech-output for the current invention. The microphone unit 19 and speaker unit 20 in the subscriber's telephone 6 can be used, in place of additional specialized hardware. These circuits provide an alternative method for the subscriber to interact with the invention, i.e. by means of translating speech into digital signals that are recognized by the CPU 12 that can be acted upon by programs stored in Program Memory 11, rather than using the Keypad Unit 17. Northern Telecom ("Flexible Vocabulary Recognition" system, Electronic Engineering Times, Jan. 31, 1994) and U.S. Sprint ("Voice Activated Foncard" service) currently have speech recognition telephone products and services. The U.S. Sprint service provides the subscriber with the capability to "dial" frequently used numbers by means of speech input, rather than keying in the telephone number. The Sprint subscribers' numbers are stored in a central on-line database system.

The modem 13, together with the telephone circuitry 6, provides the interface between the current invention and the CCTSN 4 in transmitting directory information. The data rate speed (bps) of the modem 13 is important in the implementation of the invention. The higher the data rate, the more efficient and productive the invention will be. AT&T Microelectronics has developed a modem chip set that complies with an early draft standard of the International Telecommunication Union's (ITU) 28.8 kbit/second V0.34 standard. A similar chip set is also available from Rockwell International.

The telephone circuitry 6 is the subscriber's DTMF telephone that provides access to the CCTSN 4. This circuit provides the means for the user to access all telephone subscribers listed in the on-line directories 9 and 10, as well as the Central On-line Database System 3. The subscriber can direct the current invention to dial any number listed in the on-line directories 9 and 10 and to notify the user when the dialed party answers the phone. The user can also specify that the invention continue dialing the selected number until carrier is detected. The user can also specify the number of attempts that should be tried before discontinuing the dialing of the selected number. Failure to connect to the selected number is reported to the user via the Display Unit 16, or the Voice Interface 18.

The on-line directories 9 and 10 are implemented as a B-tree file index structure in the preferred embodiment of the invention. This technique optimizes the search time to find a particular entry, or a list of entries, in the on-line directories 9 and 10. Other indexing techniques could also be employed, such as hashing as described by W. D. Maurer and T. G. Lewis in "Hash Table Methods" ACM Comp. Surv. 7, No. 1 (March 1975). A number of default indices are built that allow the subscriber to search and retrieve data from the on-line directories 9 and 10 by various criteria. These criteria include, but are not limited to those described in TABLE 1. The program needed to create and maintain these indices are stored in the Program Memory 11.

TABLE 1 i) Telephone area code, e.g. 301 for Maryland and 703 for Virginia.
ii) Telephone exchange, e.g. 469 for Bethesda Maryland, or 814 for Falls Church/McLean Virginia.
iii) Telephone number, e.g. 1-301-555-1313.
iv) Subscriber last name and initials/first name.
v) Area name, e.g. example Bethesda MD, Paris, etc.
vi) Street name, e.g. Old Georgetown Rd, Wisconsin Avenue, etc.
vii) Business type, e.g. restaurants, electricians, etc.

How would the user use these default indices? Say, for example, the user is trying to locate a person with the last name of Smith, who lives somewhere in the area of "Chevy Chase, MD". Using the present invention's search capabilities, the user selects the "By Last Name" option and enters "Smith". This is boolean ANDed to the search option "Area Name" of "Chevy Chase". When the user has finished setting up the boolean search conditions, then the request is executed. A list of entries is then displayed on the Display Unit 16 for the user to browse through. Once the list is displayed, the user can then further narrow the search by searching on the displayed list. The required entry in the list can then be selected and the invention can be directed to dial the phone number, or the entry can be added to a list in User Directory Memory 10 (see next section). The search algorithm program, stored in Program Memory 11, allows the user to use phonetic searches, as well as other boolean search criteria. For example the user can search for "Smith" OR "Smythe" in "Chevy Chase. Other boolean search operators include NOT, NOR and XOR (exclusive OR).

The user uses the user directory 10 to create lists of frequently used telephone numbers. The use of this directory is similar in principal to hand-held PDOs, such as the "Wizard" from Sharp Corporation. The primary difference is that the user browses the down-loaded, read-only directory 9, which is maintained by the Central Telephone Directory Service Provider 1, and Selects entries to add to a personal list in the user's directory 10. The user assigns a name to the list which is being created. For example, the user may want to group all family members' telephone numbers in one list, say FAMILY, in another list friends, say FRIENDS, and in yet another list frequently called numbers, say GENERAL. Once these various lists have been created, the user can then select a specific list, say FAMILY, and then search, Or browse, the list for a specific entry: instruct the invention to dial the selected number and to notify the user when the dialed number is answered (i.e. carrier detected). These user lists, and the relevant subscriber information, can be down (or up loaded) loaded into a PDO (or a Computer) via the modem 13 interface, If during an update from the Central Telephone Directory Service Provider 1 deletes, or modifies a telephone number from the user's Directory Memory 9, then the current invention will notify the user of this state, if the deleted, or modified telephone number was present in the user's User Directory Memory 10. This is accomplished visually on the Display Unit 16, or by means of the Voice Interface 18. The user can then delete the entry from the user's Directory Memory 9, or modify the telephone number, other pertinent information.

The user can also tag any entry in the directory memories 9 and 10 with a description of specific relevance. For example a business person may tag the message "gives a great lunch" onto an entry in the User Directory Memory 10.

Because the subscriber's phone can be used by potentially multiple people, e.g. in a household or in a business, the preferred embodiment of the invention provides the means to create multiple personal user directories in User Directory Memory 10. Furthermore, the preferred embodiment provides the means to maintain secure access to each personal user directory. This is achieved by means of a user identification code and password. If this option is implemented on the present invention, then a menu is provided on the Display Unit 16 illustrating the various personal directories available in User Directory Memory 10. The individual user can then select his directory to work with. Prior to the entries being displayed in the user's personal directory, the user must enter his identification code and password.

The Central Telephone Directory Service Provider 1 can trouble-shoot the current invention via the CCTSN 4. The preferred embodiment of the invention uses the Simple Network Management Protocol (SNMP) standard to implement this feature. The SNMP agent resides in Program Memory 11, and the SNMP manager resides at the Central Telephone Directory Service Provider 1. Other network device management protocols could be used, for example the OSI's CMIP standard. SNMP is used in the preferred embodiment of the invention, because it has become ubiquitous in the LAN and WAN environments.

What is claimed is:

1. A method of providing a subscriber with a local electronic telephone directory that is integrated with the subscriber's telephone, comprising the steps of:

(a) providing a first centralized telephone directory database having a plurality of data;

(b) providing a second centralized subscriber information database in communication with said first centralized database, said second centralized database including frequency and time of data transfer indicators preselected by said subscriber;

(c) providing the subscriber with an electronic device having memory, input means and display means, said device being linked with said first centralized database and providing bidirectional data transfer therebetween;

(d) selecting a first portion of data from said first centralized database using said electronic device;

(e) transferring said first portion of data selected in said selecting step from said first centralized database to said memory of said electronic device;

(f) updating said data in said first centralized database at periodic intervals;

(g) comparing said first portion of data transferred to said electronic device in said transferring step to the updated data in said first centralized database to identify any changes that have occurred in said first portion of data previously transferred in said transferring step;

(h) transferring automatically to said memory any changes in said first portion of data identified in said comparing step via an on-line transfer between said first centralized database and said electronic device in accordance with said frequency and time of data transfer indicators preselected by said subscriber; and (i) providing notification to the subscriber through said display means of said electronic device of any changes made to said first portion of data contained in said memory.

2. The method in accordance with claim 1 wherein the data in said first portion comprises telephone directory listings including telephone subscriber names, telephone numbers and addresses.

3. The method in accordance with claim 2 wherein the data in said telephone directory listings further include business telephone subscriber names and an indication of the type of business that they are involved in.

4. The method in accordance with claim 1 further comprising compressing said first portion of data in said data transferring step prior to data transfer from said first centralized database to said electronic device.

5. The method in accordance with claim 4 further comprising uncompressing said first portion of data transferred in said data transferring step by said electronic device after data transfer from said first centralized database to said electronic device.

6. The method in accordance with claim 1 further comprising the step of maintaining said first centralized database and said second centralized subscriber information database by a central service provider.

7. The method in accordance with claim 6 further comprising providing secure access to said electronic device whereby said on-line transfer of data between said first centralized database and said electronic device can only be provided by said central service provider.

8. The method in accordance with claim 7 further comprising the step of on-line monitoring of said electronic device by said central service provider.

9. The method in accordance with claim 2 further comprising the step of searching said first portion of data transferred in said electronic device's memory using at least one of the following telephone subscriber criteria:

(a) name, (b) telephone number, and (c) address.

10. The method in accordance with claim 9 further comprising the step of searching said first portion of data transferred in said electronic device's memory using the following telephone subscriber criteria:

(d) the type of business.

11. The method in accordance with claim 9 further comprising the step of using all of said criteria (a)–(c) together in executing said search.

12. The method in accordance with claim 1 further comprising the step of tagging the transferred first portion of data in said device's memory with data entered into said electronic device by said subscriber.

13. The method in accordance with claim 1 further comprising managing said transferred first portion of data in said electronic device's memory, comprising the steps of:

(a) creating separate subscriber personal directories in said memory, (b) selecting telephone directory entries from said transferred first portion of data in said memory by said input means and storing said selected entries in said separate subscriber personal directories, (c) providing security means whereby the subscriber can protect the privacy of said subscriber personal directories, and (d) providing the storage means for the subscriber to add telephone directory data not already contained in said electronic device's memory.

14. The method in accordance with claim 10 further comprising the step of the subscriber selecting a telephone number and requesting said device to automatically dial said selected telephone number on the subscriber's telephone.

15. The method in accordance with claim 14 further comprising the step of notifying the subscriber when said selected telephone number has been connected.

* * * * *